May 11, 1937.   E. L. FLEMING   2,080,121
STUFFING BOX
Filed March 29, 1935

INVENTOR.
Eli L. Fleming.
BY
*H. A. Duckman*
ATTORNEY.

Patented May 11, 1937

2,080,121

UNITED STATES PATENT OFFICE 2,080,121

STUFFING BOX

Eli L. Fleming, Long Beach, Calif.

Application March 29, 1935, Serial No. 13,643

5 Claims. (Cl. 286—34)

This invention relates to a stuffing box particularly applicable to pumping oil wells, and more particularly that stuffing box at the top of the tubing and thru which the polish rod extends. My stuffing box may, however, be applied to shafts and rods of different characters.

An object of my invention is to provide a stuffing box in which a pair of spaced packings are provided, these packings being independently adjustable and being capable of being used separately or in conjunction.

Another object is to provide a novel means of maintaining a lubricating chamber filled with oil, the lubricating chamber being so arranged as to lubricate both sets of packing.

A feature of my invention is that the upper packing—which is the one usually used—may be repacked while the well is in operation.

Another object is to provide a stuffing box which is simple in construction, inexpensive to manufacture, and effective in operation.

Other objects, advantages and features of invention may appear from the accompanying drawing, the subjoined detailed description, and the appended claims.

In the drawing

Figure 1:
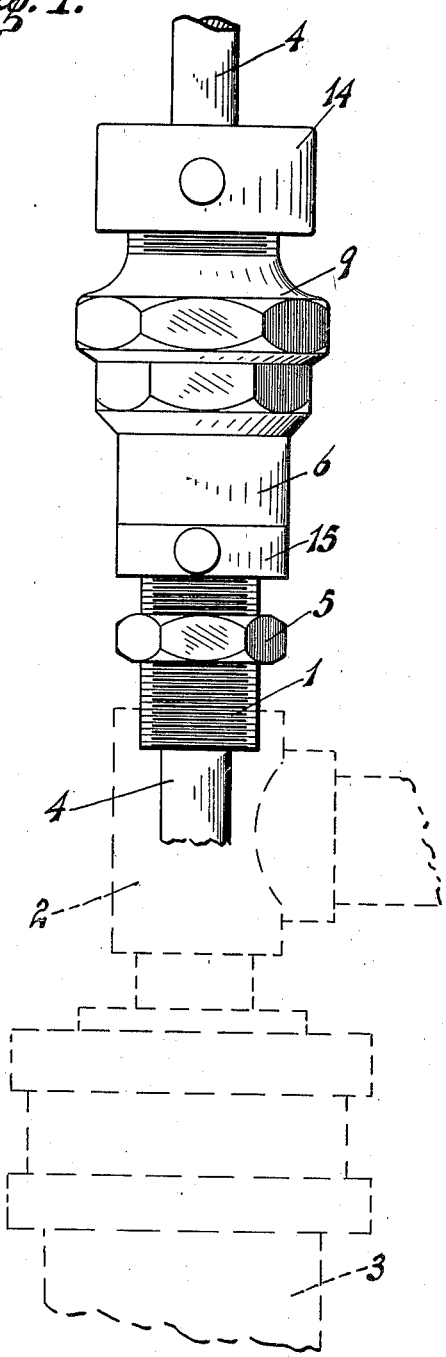
Figure 1 is a side elevation of my stuffing box.
Figure 2:
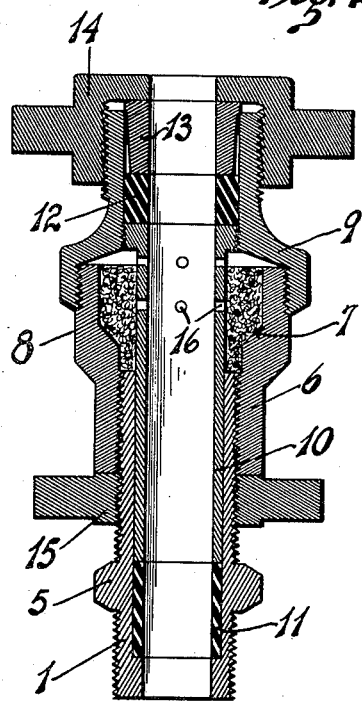
Figure 2 is a longitudinal sectional view of the same.

Referring more particularly to the drawing, the numeral 1 indicates a tube which is threaded on the outside and screws into the usual pipe fitting 2 mounted on top of the well tubing 3. The polish rod 4 extends thru the stuffing box and thru the tube 1 and is connected to the sucker rods which extend downwardly in the well. A nut 5 on the tube 1 permits this tube to be screwed into the fitting 2.

A cup 6 screws onto the tube 1 and the upper end of this cup is enlarged and counter-bored to provide a lubricating chamber 7. The lubricating chamber may be filled with wicking 8, if desired. A head 9 screws on to the cup 6 and forms the upper closure of the lubricating chamber 7. A conduit 10 screws into the head 9 and extends downwardly into the tube 1 and closely fits the wall of the tube. The conduit is tightly screwed into the head so that it will rotate with the head and cup, for a purpose to be further described.

An annular packing 11 is positioned within the tube 1 adjacent the bottom thereof and the conduit 10 acts as a follower and presses against the top of the packing for the purpose of expanding said packing against the polish rod or shaft. The packing 11 is an emergency packing, and in oil well practice, is not ordinarily used.

An upper packing 12 rests on top of the conduit 10 within the head 9. The packing 12 is forced inwardly against the polish rod by the follower 13. The follower is pressed downwardly by the cap 14 which screws onto the head 9. In oil well practice, the packing 12 is the one which is normally used. When this packing becomes worn, the lock nut 15 is loosened, whereupon the cup 7 and the head 9 are screwed downwardly on the tube 1. The conduit 10 then presses the packing 11 which packs off around the polish rod. The cap 14 can then be removed and the packing 12 replaced, even with the well in operation.

In wells which pump intermittently, the packings 11 and 12 will run dry and will therefore cut rapidly. I have, therefore, provided the lubricating chamber 7 which lubricates both the packings 11, 12 thru the ports 16 in the conduit 10. The lubricating chamber will be automatically filled with oil while the well is pumping because the polish rod will carry oil upwardly on the outer surface thereof, this oil being forced out thru the ports 16, and keeping the lubricating chamber filled. If the polish rod is dry, the oil will flow back thru the ports 16 onto the polish rod, and its reciprocation will then carry this oil onto the packings 11, 12.

Having described my invention, I claim:

1. A stuffing box, comprising an exterior threaded tube, a cup screwed onto the tube, a head mounted on the cup, packing in the tube, means depending from the head and engaging the packing whereby said packing is compressed, a second packing in the head, means to compress said second packing, said cup having a lubricating chamber therein, and conduit means extending from the lubricating chamber to both of said packings.

2. A stuffing box comprising an exterior threaded tube, a cup screwed onto the tube, a head mounted on the cup, a conduit depending from the head and extending into the tube, packing in the tube, said conduit engaging the packing, a second packing in the head, an adjustable means on the head engaging the second packing whereby the second packing is compressed.

3. A stuffing box comprising an exterior threaded tube, a cup screwed onto the tube, a head mounted on the cup, a conduit depending from the head and extending into the tube, packing in the tube, said conduit engaging the packing, a second packing in the head, an adjustable means on the head engaging the second packing whereby the second packing is compressed, said cup having a lubricating chamber therein, said conduit having ports therein extending into the lubricating chamber whereby said chamber is filled with oil from a polish rod extending thru the conduit, said ports also draining the oil back onto the polish rod when said rod is dry.

4. A stuffing box, comprising an exterior threaded tube, a cup screwed onto the tube, a head mounted on the cup, packing in the tube, means depending from the head and engaging the packing whereby said packing is compressed, a second packing in the head, means to compress said second packing, said cup having a lubricating chamber therein, conduit means extending from the lubricating chamber to both of said packings, wicking in said lubricating chamber, said conduit means having holes therein thru which oil passes into the lubricating chamber and from which oil drains from the saturated wicking.

5. A stuffing box comprising an exterior threaded tube, a cup screwed onto the tube, a head mounted on the cup, a conduit depending from the head and extending into the tube, packing in the tube, said conduit engaging the packing, a second packing in the head, an adjustable means on the head engaging the second packing whereby the second packing is compressed, said cup having a lubricating chamber therein, said conduit having ports therein extending into the lubricating chamber whereby said chamber is filled with oil from a polish rod extending thru the conduit, said ports also draining the oil back onto the polish rod when said rod is dry, wicking in the lubricating chamber, said wicking being saturated by the oil which passes into the lubricating chamber.

ELI L. FLEMING.